(12) United States Patent
Fukuda

(10) Patent No.: US 8,384,980 B2
(45) Date of Patent: Feb. 26, 2013

(54) SEMICONDUCTOR OPTICAL MODULATION DEVICE, MACH-ZEHNDER INTERFEROMETER TYPE SEMICONDUCTOR OPTICAL MODULATOR, AND METHOD FOR PRODUCING SEMICONDUCTOR OPTICAL MODULATION DEVICE

(75) Inventor: Chie Fukuda, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 7 days.

(21) Appl. No.: 13/187,781

(22) Filed: Jul. 21, 2011

(65) Prior Publication Data
US 2012/0033284 A1 Feb. 9, 2012

(30) Foreign Application Priority Data
Aug. 5, 2010 (JP) ................................. 2010-176446

(51) Int. Cl.
 *G02F 1/03* (2006.01)
(52) U.S. Cl. ........................................ 359/248
(58) Field of Classification Search .................. 359/237, 359/238, 240, 245, 247, 248; 372/41, 43.01, 372/45.01; 438/27, 31, 46, 602–604
See application file for complete search history.

(56) References Cited

U.S. PATENT DOCUMENTS
6,670,211 B2 * 12/2003 Ohkubo ........................ 438/33
7,855,155 B2 * 12/2010 Niiyama et al. .............. 438/795

FOREIGN PATENT DOCUMENTS
JP 2008-66318 A 3/2008
WO 2004/081638 A1 9/2004

* cited by examiner

*Primary Examiner* — Tuyen Tra
(74) *Attorney, Agent, or Firm* — Smith, Gambrell & Russell, LLP

(57) ABSTRACT

A semiconductor optical modulation device includes a substrate; a first semiconductor cladding layer of a first conductivity type disposed on the substrate; an optical waveguide layer disposed on the first semiconductor cladding layer, the optical waveguide layer including a first semiconductor optical confinement layer, a second semiconductor optical confinement layer, and an insulating layer disposed between the first semiconductor optical confinement layer and the second semiconductor optical confinement layer, the insulating layer being made of aluminum oxide; a second semiconductor cladding layer of a second conductivity type disposed on the optical waveguide layer; a first electrode electrically connected to the first semiconductor cladding layer; and a second electrode electrically connected to the second semiconductor cladding layer.

14 Claims, 9 Drawing Sheets

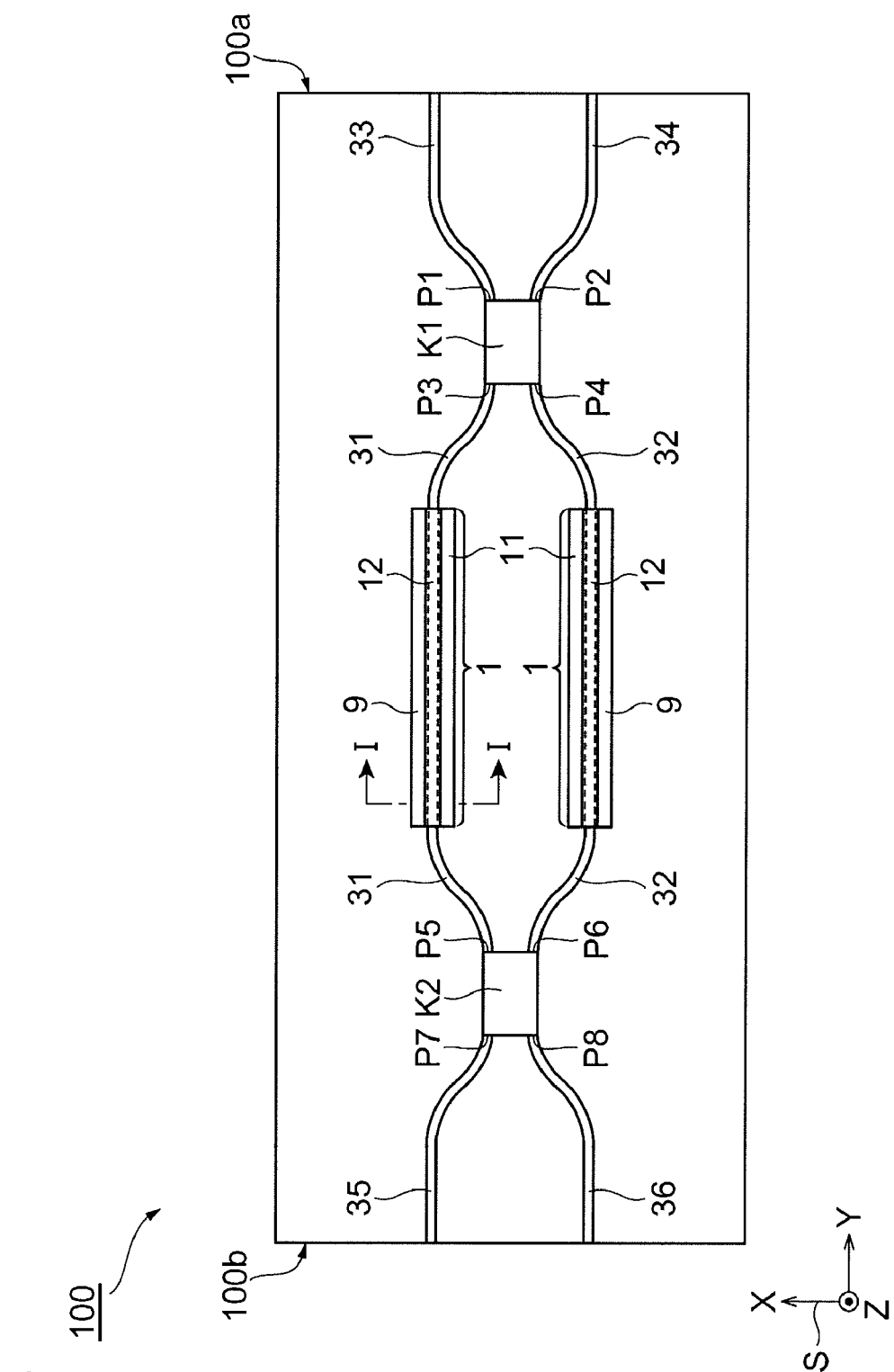

SEMICONDUCTOR OPTICAL MODULATION DEVICE, MACH-ZEHNDER INTERFEROMETER TYPE SEMICONDUCTOR OPTICAL MODULATOR, AND METHOD FOR PRODUCING SEMICONDUCTOR OPTICAL MODULATION DEVICE

BACKGROUND OF THE INVENTION

1. Field of the Invention

The present invention relates to semiconductor optical modulation devices, Mach-Zehnder interferometer type semiconductor optical modulators, and methods for producing semiconductor optical modulation devices.

2. Description of the Related Art

PCT International Publication No. WO 2004/081638 (Patent Document 1) discloses a semiconductor optical modulator. In this semiconductor optical modulator, the refractive index of a semiconductor layer is changed by applying an electric field to the semiconductor layer using the quantum-confined Stark effect (QCSE) or the Pockels effect. Therefore, optical light is modulated by changing the refractive index of the semiconductor layer according to changing the electric field. Japanese Unexamined Patent Application Publication No. 2008-66318 (Patent Document 2) discloses a semiconductor tunable laser. In this semiconductor tunable laser, the refractive index of a semiconductor layer is changed by injecting a current thereinto. A modulated optical signal is emitted form the semiconductor tunable laser by changing the injection current.

In this semiconductor tunable laser disclosed in Patent Document 2, the refractive index of the semiconductor layer is changed by injecting a stationary current or carriers to, for example, an optical waveguide layer. For the changed refractive index to be reset, carriers need to disappear. The disappearance of carriers, however, is determined by the carrier lifetime, which requires a long period of time. Accordingly, an optical modulator operating by changing an injection current has a much lower response speed than that operating by changing an electric field.

SUMMARY OF THE INVENTION

A semiconductor optical modulation device according to an aspect of the present invention includes a substrate; a first semiconductor cladding layer of a first conductivity type disposed on the substrate; an optical waveguide layer disposed on the first semiconductor cladding layer, the optical waveguide layer including a first semiconductor optical confinement layer, a second semiconductor optical confinement layer, and an insulating layer disposed between the first semiconductor optical confinement layer and the second semiconductor optical confinement layer, the insulating layer being made of aluminum oxide; a second semiconductor cladding layer of a second conductivity type disposed on the optical waveguide layer; a first electrode electrically connected to the first semiconductor cladding layer; and a second electrode electrically connected to the second semiconductor cladding layer.

In the semiconductor optical modulation device according to the above aspect, the optical waveguide layer includes the first semiconductor optical confinement layer, the second semiconductor optical confinement layer, and the insulating layer disposed between the first and second semiconductor optical confinement layers. The insulating layer is made of aluminum oxide. Thus, the insulating layer has a larger band-gap energy than the first and second semiconductor cladding layers and the first and second semiconductor optical confinement layers. The insulating layer has a higher resistivity than the first and second semiconductor cladding layers and the first and second semiconductor optical confinement layers. This prevents carriers or current from flowing through the insulating layer.

Assume that the first conductivity type is n-type and the second conductivity type is p-type. In this semiconductor optical modulation device, if a negative voltage is applied to the first electrode and a positive voltage is applied to the second electrode, carries (in this example, electrons) are injected from the first semiconductor cladding layer (in this example, n-type) to the first semiconductor optical confinement layer. On the other hand, carries (in this example, holes) are injected from the second semiconductor cladding layer (in this example, p-type) to the second semiconductor optical confinement layer. Accordingly, carriers (in this example, electrons) are accumulated in the first semiconductor optical confinement layer, and carriers (in this example, holes) are accumulated in the second semiconductor optical confinement layer. This produces the carrier plasma effect to decrease the refractive index of the first and second semiconductor optical confinement layers.

Conversely, if a positive voltage is applied to the first electrode and a negative voltage is applied to the second electrode, the carriers (in this example, electrons) accumulated in the first semiconductor optical confinement layer are withdrawn to travel to the first electrode. On the other hand, the carriers (in this example, holes) accumulated in the second semiconductor optical confinement layer are withdrawn to travel to the second electrode. This depletes electrons and holes in the semiconductor regions on both sides of the insulating layer. Accordingly, the carrier plasma effect disappears in the optical waveguide layer, thus increasing the refractive index of the first and second semiconductor optical confinement layers. In this semiconductor optical modulation device, the refractive index is modulated by applying an electric field to produce the carrier plasma effect, rather than by injecting a current, because a current is blocked by the insulating layer disposed in the optical waveguide layer. For the semiconductor optical modulation device based on the carrier plasma effect, the response speed of refractive index modulation depends on the traveling time of carriers, rather than on the carrier lifetime. The traveling time of carriers can be controlled by switching injection and withdraw of carriers or switching the polarity of the voltage applied to the first and second electrodes. The traveling time of carriers is typically shorter than the carrier lifetime. Thus, a semiconductor optical modulation device capable of high-speed response can be provided.

In the semiconductor optical modulation device according to the above aspect, the first semiconductor cladding layer preferably has a lower refractive index than the first semiconductor optical confinement layer and the second semiconductor optical confinement layer, and the second semiconductor cladding layer preferably has a lower refractive index than the first semiconductor optical confinement layer and the second semiconductor optical confinement layer. In this configuration, the optical waveguide layer disposed between the first and second semiconductor cladding layers functions as a core portion in the optical waveguide. Light propagating in the optical waveguide layer is confined therein.

In the semiconductor optical modulation device according to the above aspect, the insulating layer may have a thickness of 5 to 50 nm. In addition, the first semiconductor optical confinement layer and the second semiconductor optical confinement layer may each have a thickness of 20 to 100 nm. In addition, the average refractive index $n_{ave}$ of the optical waveguide layer constituted by the first semiconductor optical confinement layer, the insulating layer, and the second semiconductor optical confinement layer may be higher than the refractive indices of the first semiconductor cladding layer and the second semiconductor cladding layer. In the semiconductor optical modulation device according to the above aspect, light propagating in the optical waveguide layer can be effectively confined therein.

In the semiconductor optical modulation device according to the above aspect, the first semiconductor optical confinement layer may comprise a group III-V compound semiconductor of the first conductivity type, and the second semiconductor optical confinement layer may comprise a group III-V compound semiconductor of the second conductivity type. In addition, the first semiconductor optical confinement layer may comprise an undoped group III-V compound semiconductor, and second semiconductor optical confinement layer may comprise an undoped group III-V compound semiconductor.

In the semiconductor optical modulation device according to the above aspect, the insulating layer may comprise an aluminum oxide layer formed by selectively oxidizing a group III-V compound semiconductor containing aluminum. The insulating layer can be easily formed by selectively oxidizing a layer containing aluminum. In addition, the group III-V compound semiconductor containing aluminum may be AlInAs or AlGaInAs.

In the semiconductor optical modulation device according to the above aspect, the first semiconductor cladding layer, the first semiconductor optical confinement layer, the second semiconductor optical confinement layer, and the second semiconductor cladding layer each may be made of a group III-V compound semiconductor containing substantially no aluminum as a constituent element. This allows a group III-V compound semiconductor containing aluminum to be selectively oxidized.

In the semiconductor optical modulation device according to the above aspect, the semiconductor optical modulation device may further comprise a third electrode disposed on a back surface of the substrate, the substrate being a semiconductor substrate of the first conductivity type. In the semiconductor optical modulation device according to the above aspect, the third electrode can be used as, for example, a ground electrode.

A Mach-Zehnder interferometer type semiconductor optical modulator according to another aspect of the present invention includes a first arm; a second arm; a first multimode interference (MMI) coupler having two optical input ports and two optical output ports; and a second MMI coupler having two optical input ports and two optical output ports. One end of the first arm is connected to one of the two optical output ports of the first MMI coupler, whereas one end of the second arm is connected to the other of the two optical output ports of the first MMI coupler. In addition, the other end of the first arm is connected to one of the two optical input ports of the second MMI coupler, whereas the other end of the second arm is connected to the other of the two optical input ports of the second MMI coupler. The first and second arms each include a substrate; a first semiconductor cladding layer of a first conductivity type disposed on the substrate; an optical waveguide layer disposed on the first semiconductor cladding layer, the optical waveguide layer including a first semiconductor optical confinement layer, a second semiconductor optical confinement layer, and an insulating layer disposed between the first semiconductor optical confinement layer and the second semiconductor optical confinement layer, the insulating layer being made of aluminum oxide; a second semiconductor cladding layer of a second conductivity type disposed on the optical waveguide layer; a first electrode electrically connected to the first semiconductor cladding layer; and a second electrode electrically connected to the second semiconductor cladding layer. In addition, the insulating layer may have a thickness of 5 to 50 nm.

In the Mach-Zehnder interferometer type semiconductor optical modulator according to the above aspect, the voltage applied to the first and second electrodes of the first arm can be controlled to change the refractive index of the optical waveguide layer of the first arm, thereby changing the phase of the light. Similarly, the voltage applied to the first and second electrodes of the second arm can be controlled to change the refractive index of the optical waveguide layer of the second arm, thereby changing the phase of the light.

In the Mach-Zehnder interferometer type semiconductor optical modulator according to the above aspect, preferably, the two optical input ports and two optical output ports of each of the first and second MMI couplers form a through-port and a cross-port with each other, the first and second MMI couplers are configured to delay the phase of light traveling through the cross-port by 90° and not to shift the phase of light traveling through the through-port, and the first arm has a longer optical path length than the second arm by the length equivalent to a phase delay of 90°. According to the above aspect, a Mach-Zehnder interferometer type semiconductor optical modulator capable of on/off operation can be easily provided.

A method for producing a semiconductor optical modulation device according to a further aspect of the present invention includes the steps of forming a semiconductor stack by growing a first semiconductor cladding layer of a first conductivity type, a first semiconductor optical confinement layer, a group III-V compound semiconductor layer, a second semiconductor optical confinement layer, and a second semiconductor cladding layer of a second conductivity type on a semiconductor substrate in the stated order, the group III-V compound semiconductor layer containing aluminum as a group III element; forming a semiconductor mesa structure by etching the semiconductor stack; forming an insulating layer by selectively oxidizing the group III-V compound semiconductor layer; and forming a first electrode electrically connected to the first semiconductor cladding layer and a second electrode electrically connected to the second semiconductor cladding layer.

In the method for producing a semiconductor optical modulation device according to the above aspect, after the semiconductor region including the first semiconductor optical confinement layer, the group III-V compound semiconductor layer, and the second semiconductor optical confinement layer is formed, the group III-V compound semiconductor layer in the semiconductor region is oxidized. The group III-V compound semiconductor layer, which contains aluminum as a group III element, can be easily oxidized. Thus, the insulating layer can be easily formed between the first semiconductor optical confinement layer and the second semiconductor optical confinement layer.

In the method for producing a semiconductor optical modulation device according to the above aspect, preferably, a side surface of the group III-V compound semiconductor layer is partially or completely exposed to oxidize the group III-V compound semiconductor layer in the step of forming the insulating layer. In addition, preferably, the insulating layer has a thickness of 5 to 50 nm.

BRIEF DESCRIPTION OF THE DRAWINGS

FIG. 3 is a top view of a Mach-Zehnder interferometer type semiconductor optical modulator according to the embodiment of the present invention.

DESCRIPTION OF THE PREFERRED EMBODIMENTS

Figure 1:
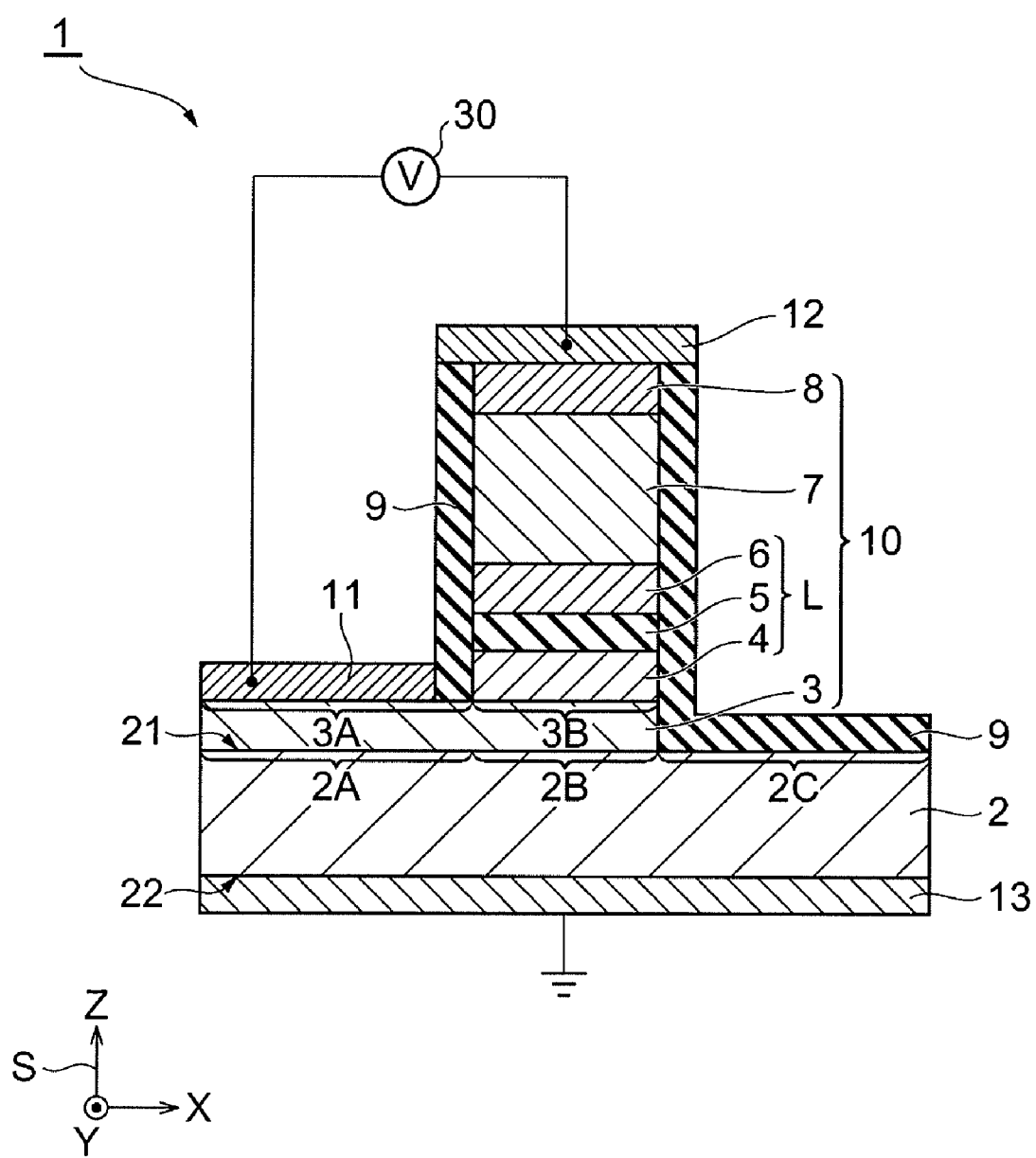
FIG. 1 is a sectional view of a semiconductor optical modulation device according to an embodiment of the present invention.

Embodiments of the present invention will now be described in detail with reference to the attached drawings, where like designations denote like elements. An XYZ Cartesian coordinate system S is shown in the drawings where necessary.

FIG. 1 is a sectional view of a semiconductor optical modulation device 1 according to an embodiment of the present invention. The semiconductor optical modulation device 1 includes a substrate 2, a first semiconductor cladding layer 3, an optical waveguide layer L, a second semiconductor cladding layer 7, a contact layer 8, a protective film 9, a first electrode 11, a second electrode 12, and a third electrode 13. The optical waveguide layer L includes a first semiconductor optical confinement layer 4, an insulating layer 5, and a second semiconductor optical confinement layer 6. The semiconductor optical modulation device 1 has a semiconductor mesa structure 10 disposed on the substrate 2. This semiconductor mesa structure 10 includes the first semiconductor cladding layer 3, the first semiconductor optical confinement layer 4, the insulating layer 5, the second semiconductor optical confinement layer 6, the second semiconductor cladding layer 7, and the contact layer 8.

The substrate 2 used can be, for example, a group III-V compound semiconductor substrate. For example, the substrate 2 is an InP substrate of a first conductivity type. The first conductivity type is, for example, n-type, and then the second conductivity type is p-type. A surface 21 of the substrate 2 includes a first surface portion 2A, a second surface portion 2B, and a third surface portion 2C. The second surface portion 2B is located between the first surface portion 2A and the third surface portion 2C. The semiconductor mesa structure 10 is disposed on the second surface portion 2B. The first surface portion 2A, the second surface portion 2B, and the third surface portion 2C are arranged in the above order in a direction (the X-axis direction in the example shown in FIG. 1) perpendicular to the direction in which the semiconductor mesa structure 10 extends (the Y-axis direction in the example shown in FIG. 1).

The first semiconductor cladding layer 3 and the second semiconductor cladding layer 7 are disposed on the substrate 2. Specifically, the first semiconductor cladding layer 3 is disposed on the first surface portion 2A and second surface portion 2B of the substrate 2. The surface of the first semiconductor cladding layer 3 includes a first surface portion 3A and a second surface portion 3B. The first surface portion 3A of the first semiconductor cladding layer 3 is located above the first surface portion 2A of the substrate 2. The second surface portion 3B of the first semiconductor cladding layer 3, on the other hand, is located above the second surface portion 2B of the substrate 2. The first semiconductor cladding layer 3 and the second semiconductor cladding layer 7 are formed of a group III-V compound semiconductor. The first semiconductor cladding layer 3 has, for example, the first conductivity type (for example, n-type). The second semiconductor cladding layer 7 has a second conductivity type (for example, p-type) different from the first conductivity type. The first semiconductor cladding layer 3 has a lower refractive index than the first semiconductor optical confinement layer 4. The second semiconductor cladding layer 7, on the other hand, has a lower refractive index than the second semiconductor optical confinement layer 6. Thus, light is confined in the first semiconductor optical confinement layer 4 and the second semiconductor optical confinement layer 6 which are located between the first semiconductor cladding layer 3 and the second semiconductor cladding layer 7. Accordingly, the first semiconductor cladding layer 3, the optical waveguide layer L and the second semiconductor cladding layer 7 constitute an optical waveguide. The optical waveguide layer L, which is disposed between the first semiconductor cladding layer 3 and the second semiconductor cladding layer 7 functions as a core portion in the optical waveguide.

The first semiconductor cladding layer 3 has a larger bandgap energy than the first semiconductor optical confinement layer 4. According to this bandgap energy relationship, one type of carriers (for example, electrons) transfers efficiently from the first semiconductor cladding layer 3 to the first semiconductor optical confinement layer 4. The second semiconductor cladding layer 7, on the other hand, has a larger bandgap energy than the second semiconductor optical confinement layer 6. According to this bandgap energy relationship, other type of carriers (for example, holes) transfers efficiently from the second semiconductor cladding layer 7 to the second semiconductor optical confinement layer 6.

Light input to the semiconductor optical modulation device 1 propagates through the optical waveguide layer L which is disposed between the first semiconductor cladding layer 3 and the second semiconductor cladding layer 7. The first semiconductor optical confinement layer 4 is disposed between the insulating layer 5 and the first semiconductor cladding layer 3. In addition, the first semiconductor optical confinement layer 4 is disposed on the second surface portion 3B of the first semiconductor cladding layer 3. The first semiconductor optical confinement layer 4 and the second semiconductor optical confinement layer 6 are formed of a group III-V compound semiconductor. The first semiconductor optical confinement layer 4 has, for example, the first conductivity type (for example, n-type). The second semiconductor optical confinement layer 6 is disposed between the insulating layer 5 and the second semiconductor cladding layer 7. The second semiconductor optical confinement layer 6 has the second conductivity type (for example, p-type). The first semiconductor optical confinement layer 4 and the second semiconductor optical confinement layer 6 preferably each have a thickness of 20 to 100 nm. If the first semiconductor optical confinement layer 4 or the second semiconductor optical confinement layer 6 has a thickness of 20 nm or more, it can accumulate sufficient carriers (electrons or holes) to change the refractive index of the first semiconductor optical confinement layer 4 or the second semiconductor optical confinement layers 6. On the other hand, if the first semiconductor optical confinement layer 4 or the second semiconductor optical confinement layer 6 has a thickness of 100 nm or less, the semiconductor optical modulation device 1 can operate at a high speed, for example, at a modulation rate of 10 Gb/s.

The insulating layer 5 prevents carriers (electrons and holes) from traveling across the insulating layer 5, for example, from the first semiconductor optical confinement layer 4 to the second semiconductor optical confinement layer 6 and from the second semiconductor optical confinement layer 6 to the first semiconductor optical confinement layer 4. The insulating layer 5 is disposed between the first semiconductor optical confinement layer 4 and the second semiconductor optical confinement layer 6. The insulating layer 5 has a larger bandgap energy than the first semiconductor cladding layer 3 and the second semiconductor cladding layer 7. The insulating layer 5 has a larger bandgap energy than the first semiconductor optical confinement layer 4 and the second semiconductor optical confinement layer 6. This large bandgap energy of the insulating layer 5 prevents carriers from traveling through the insulating layer 5 to the first semiconductor optical confinement layer 4 or the second semiconductor optical confinement layer 6. The insulating layer 5 has a lower refractive index than the first semiconductor cladding layer 3, the second semiconductor cladding layer 7, the first semiconductor optical confinement layer 4, and the second semiconductor optical confinement layer 6. However, the average refractive index $n_{ave}$ of the first semiconductor optical confinement layer 4, the insulating layer 5, and the second semiconductor optical confinement layer 6 is higher than the refractive indices of the first semiconductor cladding layer 3 and the second semiconductor cladding layer 7. This allows the optical waveguide layer L to confine light therein effectively. As used herein, the average refractive index $n_{ave}$ is represented by Eq. (1):

$$n_{ave} = \sqrt{\frac{n_4^2 t_4 + n_5^2 t_5 + n_6^2 t_6}{t_4 + t_5 + t_6}} \quad (1)$$

where $n_4$ is the refractive index of the first semiconductor optical confinement layer 4, $t_4$ is the thickness of the first semiconductor optical confinement layer 4, $n_5$ is the refractive index of the insulating layer 5, $t_5$ is the thickness of the insulating layer 5, $n_6$ is the refractive index of the second semiconductor optical confinement layer 6, and $t_6$ is the thickness of the second semiconductor optical confinement layer 6.

The insulating layer 5 can be formed by oxidizing a group III-V compound semiconductor containing aluminum as a constituent element. For example, the insulating layer 5 preferably contains aluminum oxide. In this case, because the insulating layer 5 is an aluminum oxide layer, it has a sufficiently larger bandgap energy than the first semiconductor optical confinement layer 4 and the second semiconductor optical confinement layer 6, which are formed of semiconductor materials. In addition, an aluminum oxide layer has an extremely higher resistivity than semiconductor materials. This effectively prevents carriers from traveling through the insulating layer 5 to the first semiconductor optical confinement layer 4 or the second semiconductor optical confinement layer 6. Furthermore, an aluminum oxide layer provides high electrical resistance between the first semiconductor optical confinement layer 4 and the second semiconductor optical confinement layer 6. This reduces carrier or current leakage through the insulating layer 5 when an electric field is applied to the first semiconductor optical confinement layer 4 and the second semiconductor optical confinement layer 6. If the substrate 2 is an InP substrate, the insulating layer 5 can be formed by epitaxially growing, for example, AlInAs on the substrate 2 and then oxidizing the AlInAs. The thickness of the insulating layer 5 can be controlled with high precision and reproducibility because it is determined by the thickness of the AlInAs semiconductor layer epitaxially grown on the semiconductor substrate 2. In addition, after stacking a plurality of semiconductor layers including, for example, an AlInAs layer on a semiconductor substrate, the insulating layer 5 is then formed by oxidizing the AlInAs semiconductor layer. This allows a semiconductor layer having good crystallinity to be formed on the insulating layer 5. The materials of the first semiconductor cladding layer 3, the first semiconductor optical confinement layer 4, the second semiconductor optical confinement layer 6, the second semiconductor cladding layer 7, and the contact layer 8 contain no aluminum as a constituent element. In addition, the first semiconductor cladding layer 3, the first semiconductor optical confinement layer 4, the second semiconductor optical confinement layer 6, the second semiconductor cladding layer 7, and the contact layer 8 are formed of, for example, single crystals epitaxially grown on the substrate 2.

The insulating layer 5 preferably has a thickness of 5 to 50 nm. If the insulating layer 5 has a thickness of 5 nm or more, the insulating layer 5 has a sufficiently large breakdown voltage. Furthermore, an insulating layer 5 having a thickness of 5 nm or more can be easily formed by, for example, oxidizing a group III-V compound semiconductor containing aluminum using oxidation treatment in a water vapor atmosphere. On the other hand, if the insulating layer 5 has a thickness of 50 nm or less, light guiding in the optical waveguide layer L is effectively confined therein. In this case, the optical waveguide layer L including the first semiconductor optical confinement layer 4, the insulating layer 5, and the second semiconductor optical confinement layer 6 functions as a core portion in the optical waveguide. In addition, the thermal expansion coefficient of the insulating layer 5 differs from those of the first semiconductor optical confinement layer 4 and the second semiconductor optical confinement layer 6; if the insulating layer 5 has a thickness of 50 nm or less, it can be inhibited to introduce defects in the first semiconductor optical confinement layer 4 and the second semiconductor optical confinement layer 6.

The contact layer 8 is disposed on the second semiconductor cladding layer 7 and is electrically connected to the second electrode 12. The contact layer 8 is formed of a group III-V compound semiconductor and has the second conductivity type. The second conductivity type is, for example, p-type when the first conductivity type is n-type.

The protective film 9 protects the side surfaces of the semiconductor mesa structure 10 and the third surface portion 2C of the surface 21 of the substrate 2. The protective film 9 covers the side surfaces of the first semiconductor cladding layer 3, the first semiconductor optical confinement layer 4, the insulating layer 5, the second semiconductor optical confinement layer 6, the second semiconductor cladding layer 7, and the contact layer 8. The protective film 9 is, for example, a dielectric film such as a silicon nitride (SiN) or silicon oxide (SiO$_2$) film.

The first electrode 11 is electrically connected to the first semiconductor cladding layer 3. The first electrode 11 is, for example, a cathode. The second electrode 12 is disposed on the contact layer 8 and is electrically connected to the second semiconductor cladding layer 7. The second electrode 12 is, for example, an anode. The first electrode 11 and the second electrode 12 are connected to a voltage supply 30. The third electrode 13 is disposed on a back surface 22 of the substrate 2. The third electrode 13 is, for example, a ground electrode.

An example of the semiconductor optical modulation device 1 is shown below:

Substrate 2: n-type InP
First semiconductor cladding layer 3: n-type InP, Si-doped to $1\times10^{18}$ cm$^{-3}$, 500 nm thick
First semiconductor optical confinement layer 4: n-type GaInAsP, Si-doped to $1\times10^{17}$ cm$^{-3}$, 50 nm thick
Insulating layer 5: AlInAs oxide layer, 10 nm thick
Second semiconductor optical confinement layer 6: p-type GaInAsP, Zn-doped to $1\times10^{17}$ cm$^{-3}$, 50 nm thick
Second semiconductor cladding layer 7: p-type InP, Zn-doped to $2\times10^{18}$ cm$^{-3}$, 2,000 nm
Contact layer 8: p-type GaInAs, Zn-doped to $1\times10^{19}$ cm$^{-3}$, 200 nm thick
Protective film 9: SiN
First electrode 11: AuGeNi/Au
Second electrode 12: Ti/Pt/Au
Third electrode 13: AuGeNi/Au The advantageous effects of the semiconductor optical modulation device 1 according to this embodiment will now be described. The semiconductor optical modulation device 1 has the insulating layer 5 disposed between the first semiconductor optical confinement layer 4 and the second semiconductor optical confinement layer 6 in the optical waveguide layer L. The insulating layer 5, which contains aluminum oxide, has a larger bandgap energy than the first semiconductor cladding layer 3, the second semiconductor cladding layer 7, the first semiconductor optical confinement layer 4, and the second semiconductor optical confinement layer 6, which are formed of semiconductor materials. This structure prevents carriers (electrons and holes) from flowing across the insulating layer 5.

Figure 2A:
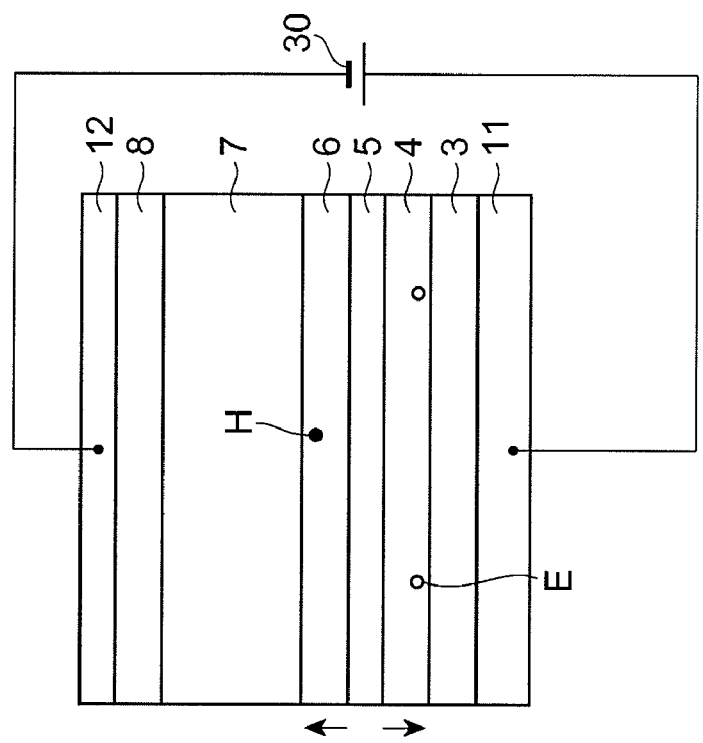
FIGS. 2A and 2B are diagrams illustrating the carrier plasma effect.

The change in refractive index will now be specifically described. Assume that the first conductivity type is n-type and the second conductivity type is p-type. Referring to FIG. 2A, in the semiconductor optical modulation device 1, a negative voltage is applied to the first electrode 11, whereas a positive voltage is applied to the second electrode 12. In this case, one type of carries (in this example, electrons E) is injected from the first semiconductor cladding layer (in this example, n-type) 3 to the first semiconductor optical confinement layer 4. On the other hand, other type of carries (in this example, holes H) is injected from the second semiconductor cladding layer (in this example, p-type) 7 to the second semiconductor optical confinement layer 6. In this embodiment, the first semiconductor optical confinement layer 4 is a semiconductor layer of the first conductivity type (in this example, n-type), whereas the second semiconductor optical confinement layer 6 is a semiconductor layer of the second conductivity type (in this example, p-type). Accordingly, one type of carriers (in this example, electrons E) is accumulated in the first semiconductor optical confinement layer 4, and other type of carriers (in this example, holes H) is accumulated in the second semiconductor optical confinement layer 6. This produces the carrier plasma effect to decrease the refractive indices of those first and second semiconductor optical confinement layers 4, 6.

Figure 2B:
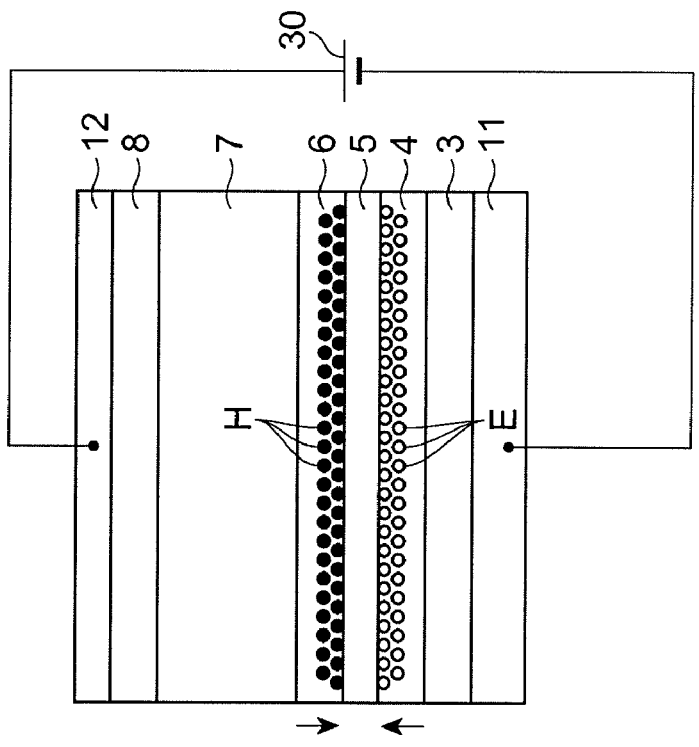

Referring to FIG. 2B, conversely, a positive voltage is applied to the first electrode 11, whereas a negative voltage is applied to the second electrode 12. In this case, the electrons E accumulated in the first semiconductor optical confinement layer 4 are withdrawn to travel to the first electrode 11. On the other hand, the holes H accumulated in the second semiconductor optical confinement layer 6 are withdrawn to travel to the second electrode 12. This depletes the electrons E and the holes H in the semiconductor regions on both sides of the insulating layer 5. Accordingly, the carrier plasma effect disappears in the optical waveguide layer L, thus increasing the refractive indices of those first and second semiconductor optical confinement layers 4, 6. In this semiconductor optical modulation device 1, the refractive index is modulated by applying an electric field to produce the carrier plasma effect, rather than by injecting a current, because a current is blocked by the insulating layer 5 disposed in the optical waveguide layer L. For the semiconductor optical modulation device 1 based on the carrier plasma effect, the response speed of refractive index modulation depends on the traveling time of carriers, rather than on the carrier life time. The traveling time of carriers can be controlled by switching injection and withdraw of carriers or switching the polarity of the voltage applied to the first and second electrodes, 11, 12. The traveling time of carriers is typically shorter than the carrier lifetime. When the refractive index of the semiconductor layer is changed by injecting current therein, the response speed of refractive index modulation depends on the carrier lifetime. Therefore, the semiconductor optical modulation device 1 is capable of high-speed response comparing to an optical modulator operating by injecting current. Similar effects can be provided even if the first semiconductor optical confinement layer 4 and the second semiconductor optical confinement layer 6 are undoped semiconductor layers. As used herein, the term "undoped semiconductor layer" refers to an intrinsic semiconductor layer in which impurities are not intentionally doped.

The change in refractive index is small in the voltage range used for known semiconductor optical modulators based on QCSE or the Pockels effect, for example, 3 to 5 V. Accordingly, the length of the optical waveguide layer has to be increased to achieve the phase shift required for use as a semiconductor optical modulator. In contrast, the voltage required for refractive index modulation of the semiconductor optical modulation device 1 according to this embodiment needs only to be high enough to cause carriers to travel, for example, 0.5 to 3 V. Thus, the semiconductor optical modulation device 1 according to this embodiment enables sufficient refractive index modulation at a lower voltage than known semiconductor optical modulators based on QCSE or the Pockels effect.

In addition, the semiconductor optical modulation device 1 according to this embodiment can be used for a Mach-Zehnder interferometer type semiconductor optical modulator. Referring to FIG. 3, a Mach-Zehnder interferometer type semiconductor optical modulator 100 includes a first arm 31, a second arm 32, a third arm 33, a fourth arm 34, a fifth arm 35, a sixth arm 36, a first multimode interference (MMI) coupler K1, and a second MMI coupler K2. FIG. 1 is a cross section taken along line I-I of FIG. 3. The first arm 31 has a semiconductor optical modulation device 1. Similarly, the second arm 32 has a semiconductor optical modulation device 1. The first MMI coupler K1 has two optical input ports P1 and P2 and two optical output ports P3 and P4. The second MMI coupler K2 has two optical input ports P5 and P6 and two optical output ports P7 and P8.

One end of the first arm 31 is connected to one of the two optical output ports P3 and P4 of the first MMI coupler K1, namely, P3. The other end of the first arm 31 is connected to one of the two optical input ports P5 and P6 of the second MMI coupler K2, namely, P5. One end of the second arm 32 is connected to the other of the two optical output ports P3 and P4 of the first MMI coupler K1, namely, P4. The other end of the second arm 32 is connected to the other of the two optical input ports P5 and P6 of the second MMI coupler K2, namely, P6. One end of the third arm 33 is connected to one end 100a of the Mach-Zehnder interferometer type semiconductor optical modulator 100. The other end of the third arm 33 is connected to one of the two optical input ports P1 and P2 of the first MMI coupler K1, namely, P1. One end of the fourth arm 34 is connected to the end 100a of the Mach-Zehnder interferometer type semiconductor optical modulator 100. The other end of the fourth arm 34 is connected to the other of the two optical input ports P1 and P2 of the first MMI coupler K1, namely, P2. One end of the fifth arm 35 is connected to one of the two optical output ports P7 and P8 of the second MMI coupler K2, namely, P7. The other end of the fifth arm 35 is connected to the other end 100b of the Mach-Zehnder interferometer type semiconductor optical modulator 100. One end of the sixth arm 36 is connected to the other end 100b of the Mach-Zehnder interferometer type semiconductor optical modulator 100. The other end of the sixth arm 36 is connected to the other of the two optical output ports P7 and P8 of the second MMI coupler K2, namely, P8.

An example of the operation of the Mach-Zehnder interferometer type semiconductor optical modulator 100 will now be described. When light travels through the first MMI coupler K1 or the second MMI coupler K2, the phase of the light traveling in a crossing direction (cross-port) is delayed by 90°. On the other hand, the phase of the light traveling in a straight direction (through-port) does not shift. In addition, the second arm 32 has a longer optical path length than the first arm 31 by the length equivalent to a phase delay of 90° for the light traveling in the first and second arms 31, 32. Light input from the fourth arm 34 to the optical input port P2 travels through the first MMI coupler K1 to be split into the first arm 31 and the second arm 32 at an intensity ratio of 1:1. The optical output port P3 of the first MMI coupler K1 is the cross-port for the optical input port P2. The optical output port P4 of the first MMI coupler K1, on the other hand, is the through-port for the optical input port P2. The phase of the light output from the optical output port P3 of the first MMI coupler K1 to the first arm 31 is delayed by 90°. Hence, the phase of the light at one end of the first arm 31 relative to the second arm 32 is −90°. The phase of the light output from the optical output port P4 of the first MMI coupler K1 to the second arm 32 is not delayed. Hence, the phase of the light at one end of the second arm 32 is 0°.

First, if a negative voltage is applied to the first electrode 11 of the semiconductor optical modulation device 1 of the first arm 31 and a positive voltage is applied to the second electrode 12, the refractive index of the optical waveguide layer L in the semiconductor optical modulation device 1 of the first arm 31 is decreased by the carrier plasma effect. Accordingly, the speed of the light traveling through the first arm 31 is increased, and the phase of the light is advanced. If the voltage conditions are set so that the amount of phase advance is 45°, the phase of the light traveling to the other end of the first arm 31 is $(-90°)+(+45°)=-45°$.

In addition, if a positive voltage is applied to the first electrode 11 of the semiconductor optical modulation device 1 of the second arm 32 and a negative voltage is applied to the second electrode 12, the refractive index of the optical waveguide layer L in the semiconductor optical modulation device 1 of the second arm 32 is increased by the carrier plasma effect. Accordingly, the speed of the light traveling through the second arm 32 is decreased, and the phase of the light is delayed. The voltage conditions are set so that the amount of phase delay is 45°. Because the second arm 32 has a longer optical path length than the first arm 31 by the length equivalent to a phase delay of 90°, the phase of the light traveling to the other end of the second arm 32 is determined by adding these phase delays together, namely, $(-45°)+(-90°)=-135°$.

The optical input port P5 of the second MMI coupler K2 is in a through-port relationship with the optical output port P7, whereas the optical input port P6 is in a cross-port relationship with the optical output port P7. Accordingly, the phase of the light traveling from the other end of the first arm 31 through the optical input port P5 and the optical output port P7 remains −45°. On the other hand, the phase of the light traveling from the other end of the second arm 32 through the optical input port P6 and the optical output port P7 is further delayed by the second MMI coupler K2 by 90°, namely, −225°. Hence, the difference between the phase of the light traveling from the first arm 31 to the optical output port P7 and the phase of the light traveling from the second arm 32 to the optical output port P7 is 180°. This results in destructive interference, so that no light exits the optical output port P7.

In addition, the optical input port P6 of the second MMI coupler K2 is in a through-port relationship with the optical output port P8, whereas the optical input port P5 is in a cross-port relationship with the optical output port P8. Accordingly, the phase of the light traveling from the other end of the first arm 31 through the optical input port P5 and the optical output port P8 is $(-45°)+(-90°)=-135°$. The phase of the light traveling from the other end of the second arm 32 through the optical input port P6 and the optical output port P8 remains −135°. The difference between the phase of the light traveling from the first arm 31 to the optical output port P8 and the phase of the light traveling from the second arm 32 to the optical output port P8 is 0°. This results in constructive interference, so that the light exits the optical output port P8.

Next, if a positive voltage is applied to the first electrode 11 of the semiconductor optical modulation device 1 of the first arm 31 and a negative voltage is applied to the second electrode 12, the refractive index of the optical waveguide layer L in the semiconductor optical modulation device 1 of the first arm 31 is increased by the carrier plasma effect. Accordingly, the speed of the light traveling through the first arm 31 is decreased, and the phase of the light is delayed. If the voltage conditions are set so that the amount of phase delay is 45°, the phase of the light traveling to the other end of the first arm 31 is $(-90°)+(-45°)=-135°$.

In addition, if a negative voltage is applied to the first electrode 11 of the semiconductor optical modulation device 1 of the second arm 32 and a positive voltage is applied to the second electrode 12, the refractive index of the optical waveguide layer L in the semiconductor optical modulation device 1 of the second arm 32 is decreased by the carrier plasma effect. Accordingly, the speed of the light traveling through the second arm 32 is increased, and the phase of the light is advanced. The voltage conditions are set so that the amount of phase advance is 45°. Because the second arm 32 has a longer path length than the first arm 31 by the length equivalent to a phase delay of 90°, the phase of the light traveling to the other end of the second arm 32 is determined by adding these phase shifts together, namely, (+45°)+(−90°)=−45°.

The optical input port P5 of the second MMI coupler K2 is in a through-port relationship with the optical output port P7, whereas the optical input port P6 is in a cross-port relationship with the optical output port P7. Accordingly, the phase of the light traveling from the other end of the first arm 31 through the optical input port P5 and the optical output port P7 remains −135°. The phase of the light traveling from the other end of the second arm 32 through the optical input port P6 and the optical output port P7 is further delayed by the second MMI coupler K2 by 90°, namely, −135°. Hence, the difference between the phase of the light traveling from the first arm 31 to the optical output port P7 and the phase of the light traveling from the second arm 32 to the optical output port P7 is 0°. This results in constructive interference, so that the light exits the optical output port P7.

In addition, the optical input port P6 of the second MMI coupler K2 is in a through-port relationship with the optical output port P8, whereas the optical input port P5 is in a cross-port relationship with the optical output port P8. Accordingly, the phase of the light traveling from the other end of the first arm 31 through the optical input port P5 and the optical output port P8 is (−135°)+(−90°)=−225°. The phase of the light traveling from the other end of the second arm 32 through the optical input port P6 and the optical output port P8 remains −45°. Hence, the difference between the phase of the light traveling from the first arm 31 to the optical output port P8 and the phase of the light traveling from the second aim 32 to the optical output port P8 is 180°. This results in destructive interference, so that no light exits the optical output port P8.

As described above, the voltage applied to the first electrode 11 and second electrode 12 of the first arm 31 can be controlled to change the refractive index of the optical waveguide layer L of the first arm 31, thereby changing the phase of the light through the optical waveguide layer L of the first arm 31. Similarly, the voltage applied to the first electrode 11 and second electrode 12 of the second arm 32 can be controlled to change the refractive index of the optical waveguide layer L of the second arm 32, thereby changing the phase of the light through the optical waveguide layer L of the first arm 32. Thus, a Mach-Zehnder interferometer type semiconductor optical modulator 100 capable of on/off operation can be provided. In this Mach-Zehnder interferometer type semiconductor optical modulator 100, the refractive index is modulated by applying an electric field to produce the carrier plasma effect, rather than by injecting a current, because a current is blocked by the insulating layers 5 disposed in the optical waveguide layers L of the semiconductor optical modulation devices 1. The response speed of refractive index modulation based on the carrier plasma effect depends on the traveling time of carriers. The traveling time of carriers can be controlled by switching injection and withdraw of carriers or switching the polarity of the voltage applied to the first and second electrodes, 11, 12. The traveling time of carriers is typically shorter than the carrier lifetime. Thus, a Mach-Zehnder interferometer type semiconductor optical modulator 100 capable of high-speed response can be provided.

Figure 4A:
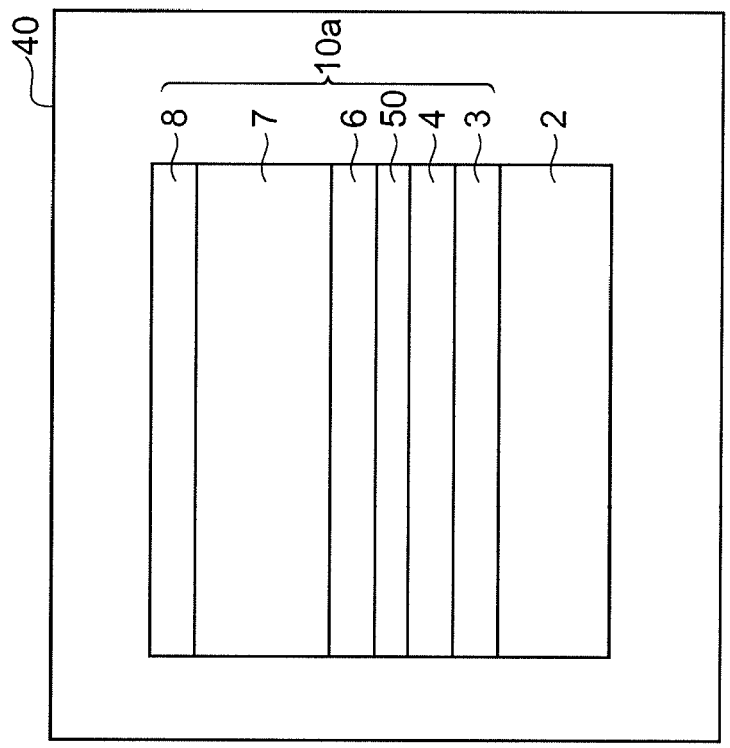
FIG. 4A is a sectional view showing a stacking step.

An example of a method for producing the semiconductor optical modulation device 1 will now be described step by step with reference to FIGS. 4A to 9B. Referring to FIG. 4A, first, a semiconductor stack 10a is formed on the substrate 2 using a growth apparatus 40 such as a metal-organic vapor phase epitaxy (MOVPE) apparatus (stacking step). Specifically, the first semiconductor cladding layer 3, the first semiconductor optical confinement layer 4, a group III-V compound semiconductor layer 50, the second semiconductor optical confinement layer 6, the second semiconductor cladding layer 7, and the contact layer 8 are epitaxially grown on the substrate 2 in the above order to form the semiconductor stack 10a. The group III-V compound semiconductor layer 50 contains aluminum as a group III element. The first semiconductor cladding layer 3 has the first conductivity type, whereas the second semiconductor cladding layer 7 has the second conductivity type different from the first conductivity type. When the first conductivity type is, for example, n-type, then the second conductivity type is p-type. The first semiconductor cladding layer 3 has a lower refractive index than the first semiconductor optical confinement layer 4. The second semiconductor cladding layer 7, on the other hand, has a lower refractive index than the second semiconductor optical confinement layer 6.

Figure 4B:
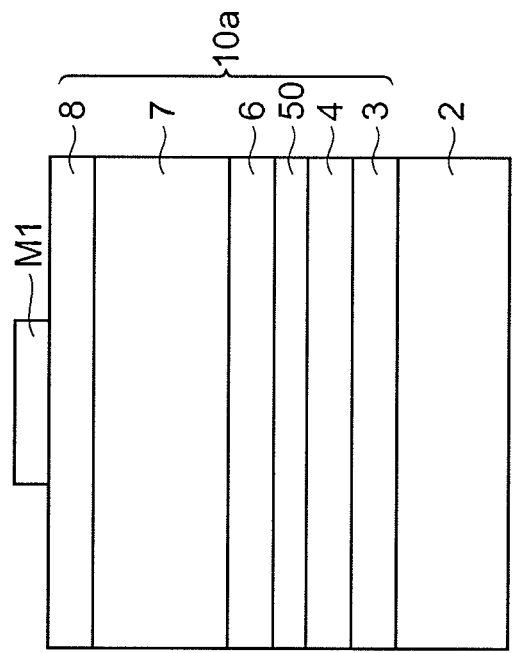
FIG. 4B is a sectional view showing a first mask formation step.

Referring to FIG. 4B, a first mask M1 for formation of a semiconductor mesa structure is formed on the contact layer 8. For example, a silicon oxide ($SiO_2$) mask film is deposited on the contact layer 8 using, for example, a plasma-enhanced chemical vapor deposition (CVD) apparatus. A photoresist is then applied to the mask film and is patterned by photolithography (not shown). The patterned photoresist is used to etch the $SiO_2$ mask film by, for example, reactive ion etching (RIE) with $C_2F_6$ gas, thus forming the first mask M1.

Figure 5B:
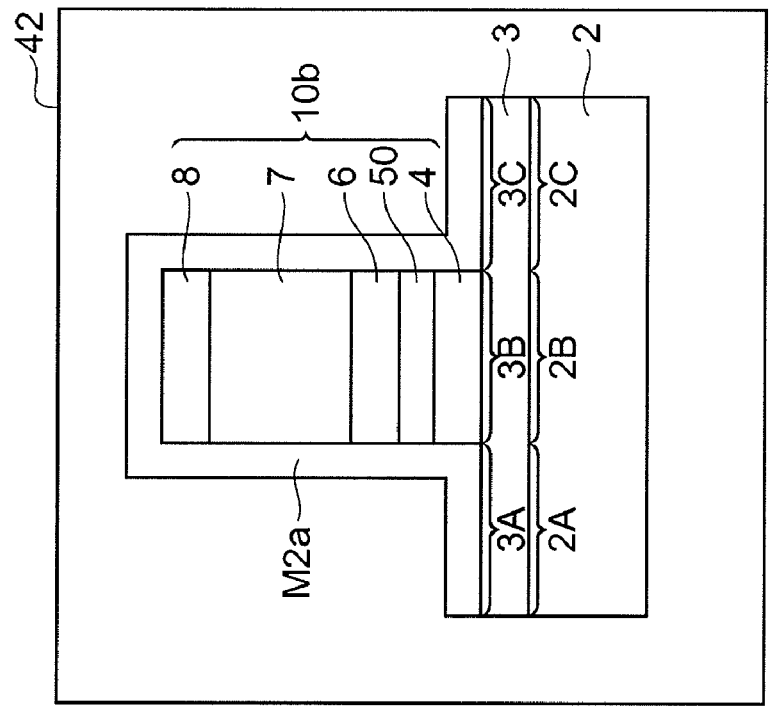
FIG. 5B is a sectional view showing a second mask film formation step.
Figure 5A:
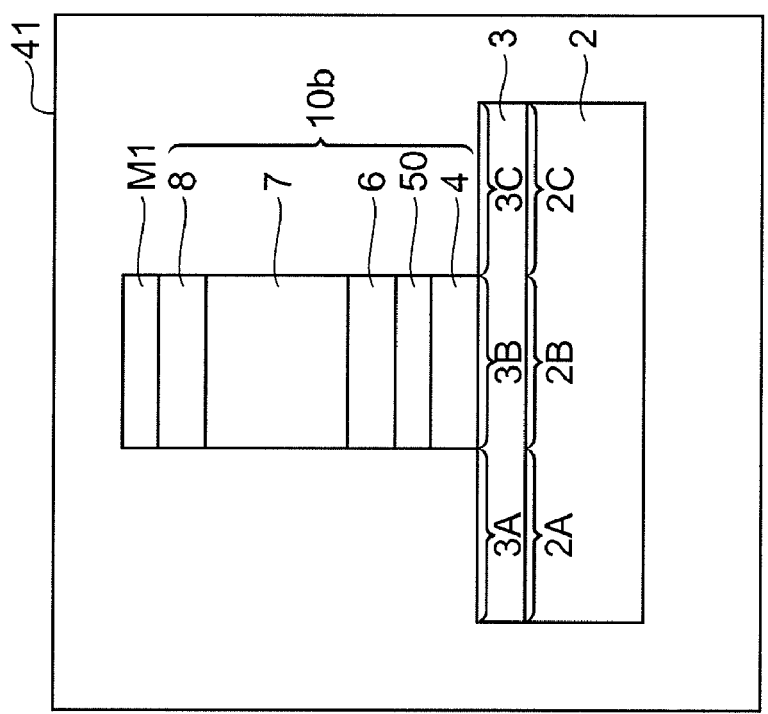
FIG. 5A is a sectional view showing a first semiconductor mesa structure formation step.

Referring to FIG. 5A, the semiconductor stack 10a is etched using the first mask M1. In this step, the layers from the contact layer 8 to the first semiconductor optical confinement layer 4 are etched to form a first semiconductor mesa structure 10b. The etching is performed by, for example, RIE using a chlorine-containing gas in an etching apparatus 41. The first semiconductor mesa structure 10b includes the first semiconductor optical confinement layer 4, the group III-V compound semiconductor layer 50, the second semiconductor optical confinement layer 6, the second semiconductor cladding layer 7, and the contact layer 8. The first surface portion 2A, second surface portion 2B, and third surface portion 2C of the substrate 2 are arranged in the above order in a direction perpendicular to the direction in which the first semiconductor mesa structure 10b extends. In addition, the surface of the first semiconductor cladding layer 3 includes a first surface portion 3A, a second surface portion 3B, and a third surface portion 3C. The first surface portion 3A is located above the first surface portion 2A. The second surface portion 3B is located above the second surface portion 2B. The third surface portion 3C is located above the third surface portion 2C. The first semiconductor mesa structure 10b is formed on the second surface portion 3B of the first semiconductor cladding layer 3. Referring then to FIG. 5B, a film M2a for a second mask M2 is formed on the substrate 2 using a plasma-enhanced CVD apparatus 42. The film M2a for the second mask M2 covers the first surface portion 3A and third surface portion 3C of the first semiconductor cladding layer 3 and the two side surfaces and top surface of the first semiconductor mesa structure 10b. The film M2a for the second mask M2 is a dielectric film such as a $SiO_2$ or SiN film.

Figure 6A:
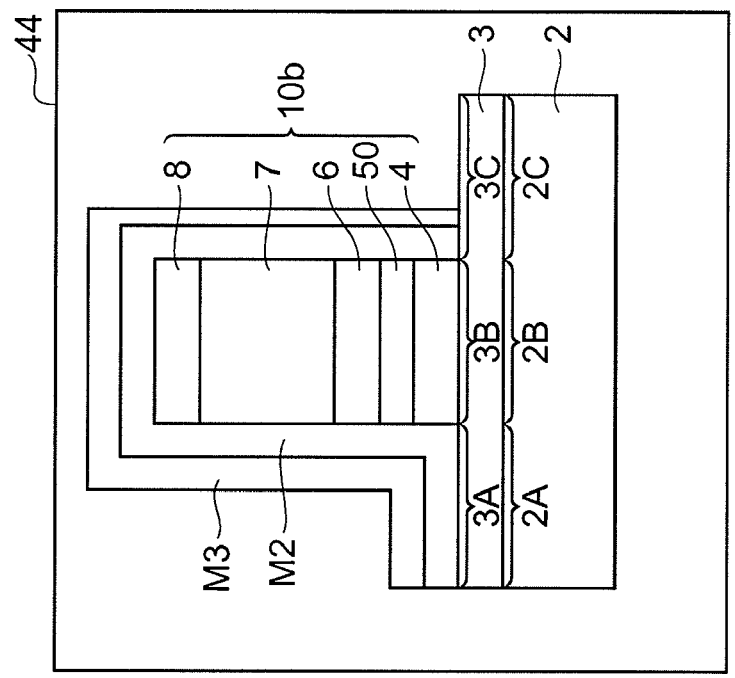
FIG. 6A is a sectional view showing a third mask formation step.
Figure 6B:
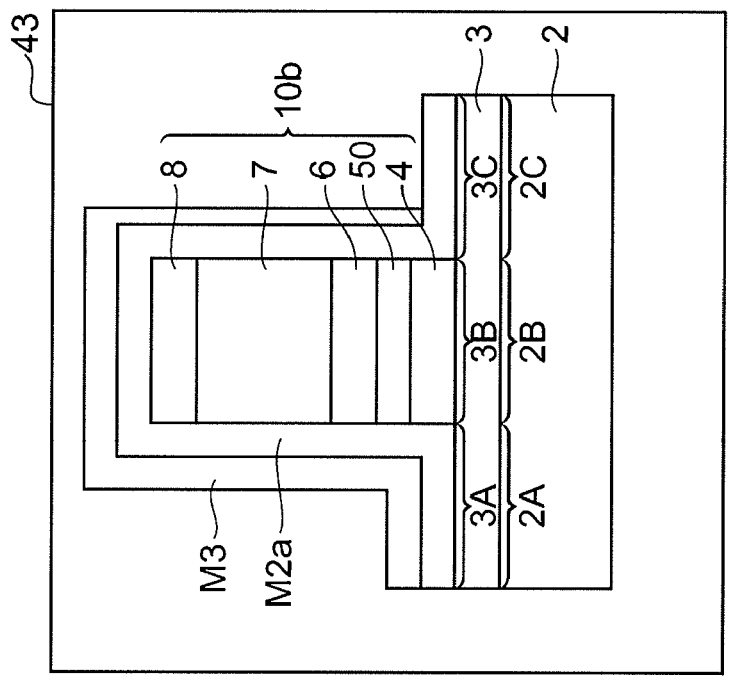
FIG. 6B is a sectional view showing a second mask formation step.

In addition, a resist is applied so as to cover the film M2a. Referring to FIG. 6A, the resist is subjected to exposure and development using a photolithography apparatus 43 to form a third mask M3. The third mask M3 covers the portion of the film M2a covering the first surface portion 3A and second surface portion 3B of the first semiconductor cladding layer 3. Referring to FIG. 6B, the portion of the film M2a over the third surface portion 3C of the first semiconductor cladding layer 3 is etched using the third mask M3 to form the second mask M2. The etching is performed by, for example, RIE using $C_2F_6$ gas in an etching apparatus 44. The third mask M3 is removed thereafter.

Figure 7A:
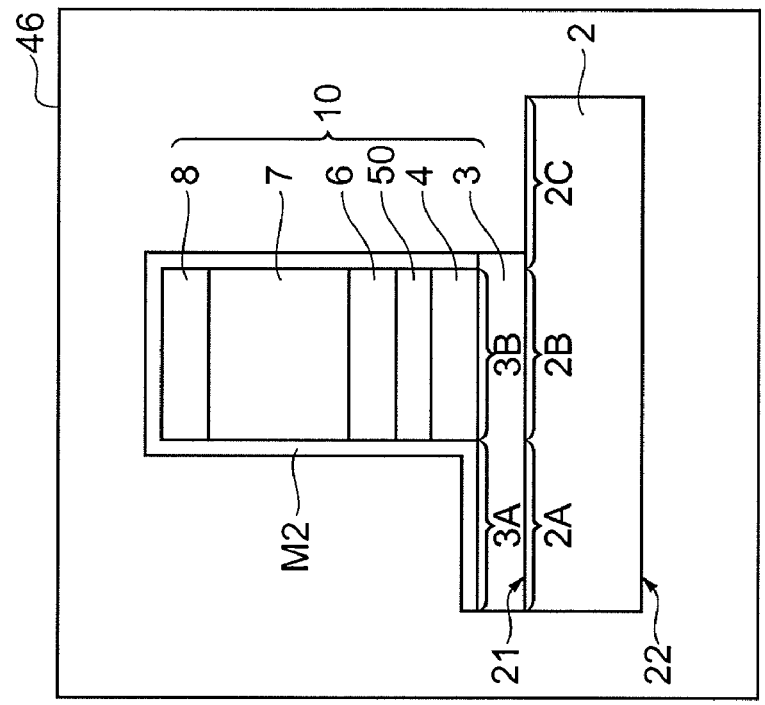
FIG. 7A is a sectional view showing the state before a first semiconductor cladding layer etching step.
Figure 7B:
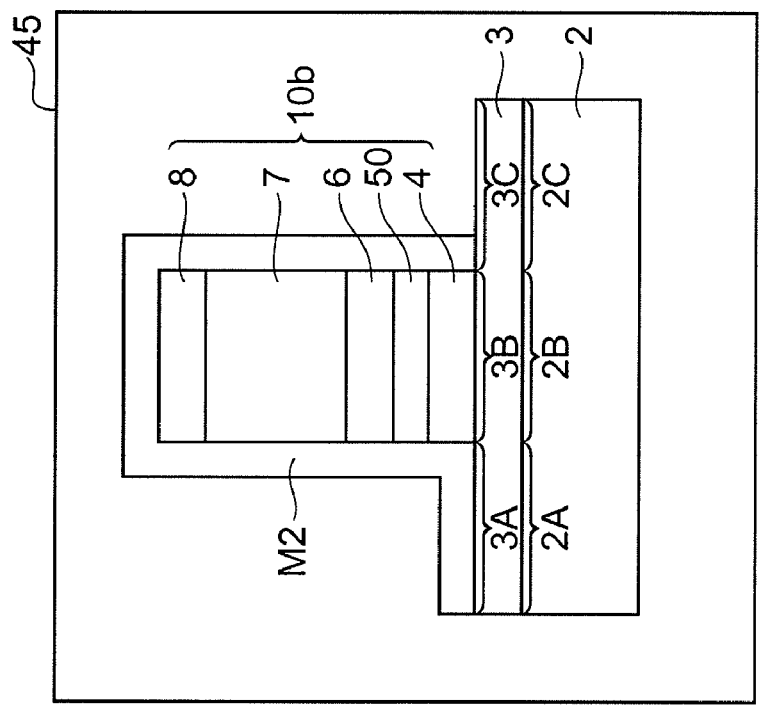
FIG. 7B is a sectional view showing the state after the first semiconductor cladding layer etching step.

Referring then to FIG. 7A, the first semiconductor cladding layer 3 is etched using the second mask M2. Referring to FIG. 7B, in this step, the third surface portion 3C of the first semiconductor cladding layer 3 is etched. The etching is performed by, for example, RIE using $CH_4$ and $H_2$ gases in an etching apparatus 46. In this way, the third surface portion 3C of the first semiconductor cladding layer 3 is etched to form a second semiconductor mesa structure 10 (semiconductor mesa structure formation step). The second semiconductor mesa structure 10 includes the first semiconductor cladding layer 3, the first semiconductor optical confinement layer 4, the group III-V compound semiconductor layer 50, the second semiconductor optical confinement layer 6, the second semiconductor cladding layer 7, and the contact layer 8. In addition, the third surface portion 2C of the substrate 2 is exposed after the etching of the third surface portion 3C of the first semiconductor cladding layer 3. The second mask M2 is removed with hydrofluoric acid thereafter.

Figure 8A:
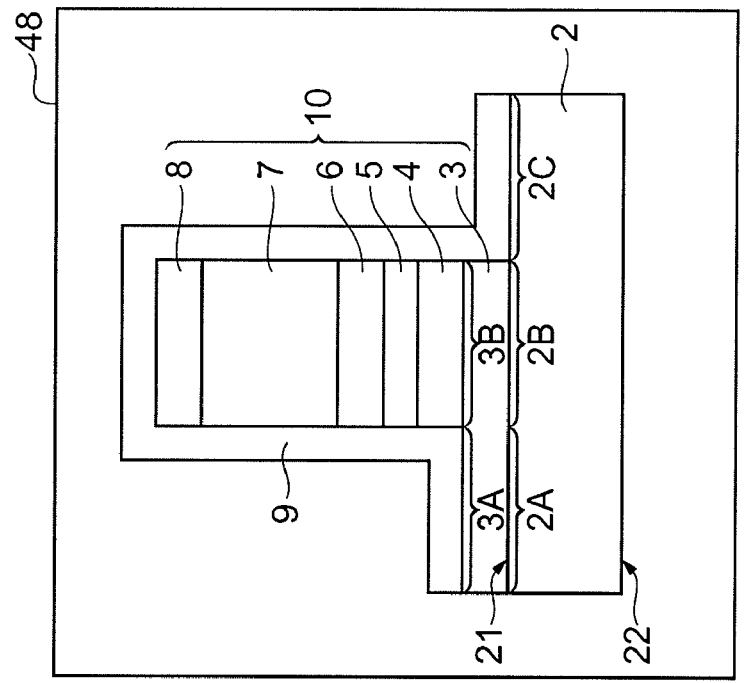
FIG. 8A is a sectional view showing an insulating layer formation step.
Figure 8B:
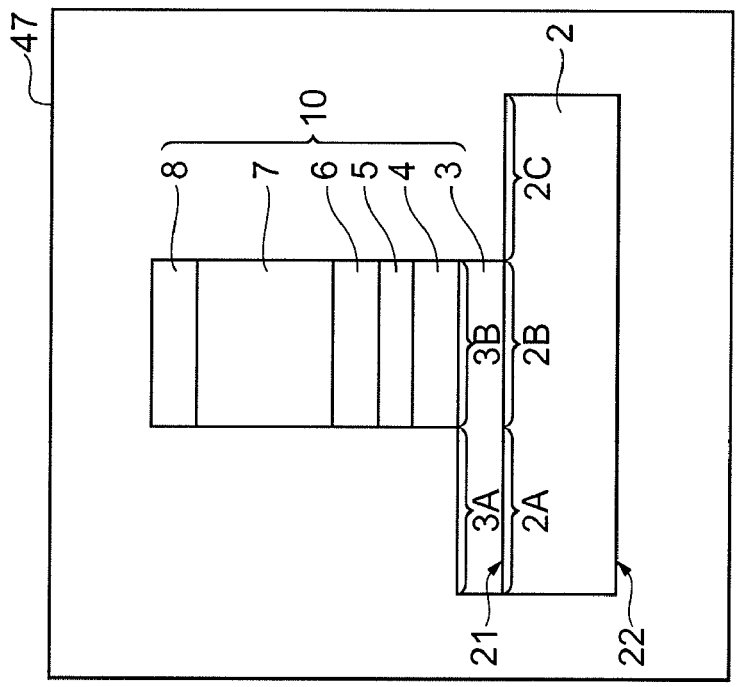
FIG. 8B is a sectional view showing a protective film formation step.

Referring to FIG. 8A, the group III-V compound semiconductor layer 50, which contains aluminum as a group III element, is oxidized to form the insulating layer 5 (insulating layer formation step). In this insulating layer formation step, the side surfaces of the group III-V compound semiconductor layer 50 are completely exposed to oxidize the group III-V compound semiconductor layer 50. The oxidation is performed by heating the group III-V compound semiconductor layer 50 in, for example, a water vapor atmosphere in a heating apparatus 47. In this step, the entire group III-V compound semiconductor layer 50 is oxidized. The group III-V compound semiconductor layer 50 is formed of, for example, AlInAs or AlGaInAs. The materials of the first semiconductor cladding layer 3, the first semiconductor optical confinement layer 4, the second semiconductor optical confinement layer 6, the second semiconductor cladding layer 7, and the contact layer 8 contain no aluminum as a constituent element. A group III-V compound semiconductor containing aluminum as a group III element is more easily oxidized than a group III-V compound semiconductor containing no aluminum. In the insulating layer formation step, therefore, if the semiconductor substrate 2 is placed in a water vapor atmosphere, the layers other than the group III-V compound semiconductor layer 50 formed on the semiconductor substrate 2 are hardly oxidized; the group III-V compound semiconductor layer 50 is selectively oxidized. The insulating layer 5, which contains aluminum oxide, has a larger bandgap energy than the first semiconductor cladding layer 3, the second semiconductor cladding layer 7, the first semiconductor optical confinement layer 4, and the second semiconductor optical confinement layer 6, which are formed of semiconductor materials. Referring to FIG. 8B, the protective film 9 is deposited on the substrate 2 using a plasma-enhanced CVD apparatus 48. The protective film 9 covers the second semiconductor mesa structure 10, the first surface portion 3A of the first semiconductor cladding layer 3, and the third surface portion 2C of the substrate 2. The protective film 9 used can be, for example, a dielectric film such as a silicon nitride (SiN) or silicon oxide ($SiO_2$) film.

Figure 9A:
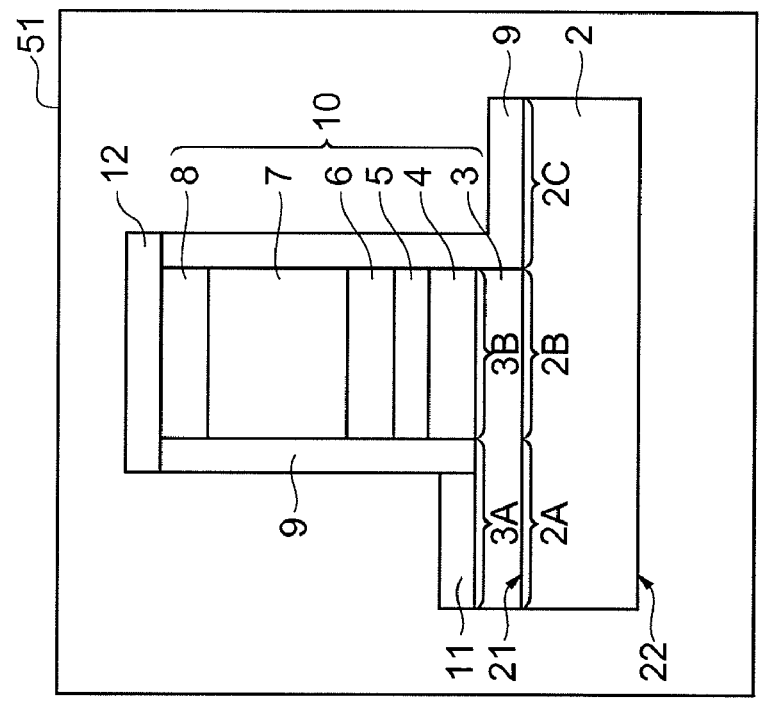
FIG. 9A is a sectional view showing a protective film processing step.
Figure 9B:
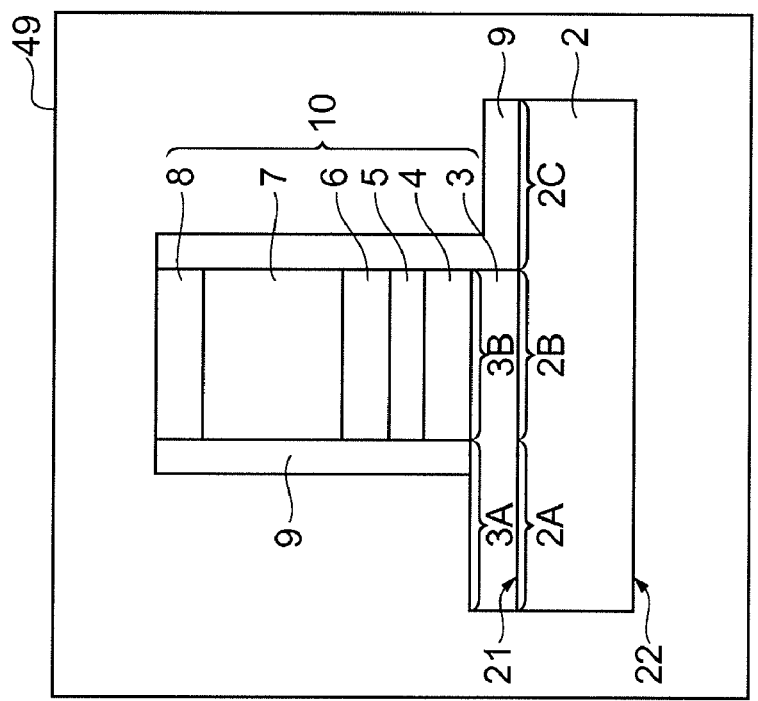
FIG. 9B is a sectional view showing an electrode formation step.

Referring to FIG. 9A, the portions of the protective film 9 over the top surface of the second semiconductor mesa structure 10 and the first surface portion 3A of the first semiconductor cladding layer 3 are etched. The etching is performed by, for example, RIE using $C_2F_6$ gas in an etching apparatus 49. Referring then to FIG. 9B, the first electrode 11 and the second electrode 12 are formed using a vacuum evaporation apparatus 51 (electrode formation step). The first electrode 11 is electrically connected to the first semiconductor cladding layer 3. The second electrode 12, on the other hand, is electrically connected to the second semiconductor cladding layer 7 via the contact layer 8. Specifically, the first electrode 11 is made of, for example, AnGeNi/Au for an n-type ohmic electrode. The second electrode 12 is made of, for example, Ti/Pt/Au for a p-type ohmic electrode. These electrode materials are deposited using a resist mask so as to cover the protective film 9 and the second semiconductor mesa structure 10. The first electrode 11 and the second electrode 12 are formed by using lift-off techniques, as shown in FIG. 9B. In this step, the first electrode 11 is formed on the first surface portion 3A of the first semiconductor cladding layer 3, and the second electrode 12 is formed on the top surface of the contact layer 8. In addition, the third electrode 13 is also formed on the back surface 22 of the substrate 2 by using a vacuum evaporation apparatus 51. The third electrode 13 is made of, for example, AnGeNi/Au for an n-type ohmic electrode.

Through the above process, the semiconductor optical modulation device 1 is produced. After the electrode formation step, the semiconductor optical modulation device 1 is bonded to a predetermined position of a lead frame (die bonding step). After the die bonding step, the first electrode 11 and second electrode 12 of the semiconductor optical modulation device 1 are connected to the lead frame with wires (wire bonding step). In addition, the third electrode 13 is grounded. Thus, the semiconductor optical modulation device 1 shown in FIG. 1 is completed.

In this method for producing the semiconductor optical modulation device 1, after the semiconductor region including the first semiconductor optical confinement layer 4, the group III-V compound semiconductor layer 50, and the second semiconductor optical confinement layer 6 is formed, the group III-V compound semiconductor layer 50 in the semiconductor region is selectively oxidized. The group III-V compound semiconductor layer 50, which contains aluminum as a group III element, is more easily oxidized than a group III-V compound semiconductor containing no aluminum. Thus, the insulating layer 5 can be easily formed between the first semiconductor optical confinement layer 4 and the second semiconductor optical confinement layer 6.

Whereas a preferred embodiment has been described in detail above, the present invention is not limited to the above embodiment. For example, the substrate 2 may be a semi-insulating InP substrate. If a Mach-Zehnder interferometer type semiconductor optical modulator is constructed using the semiconductor optical modulation device 1 according to this embodiment, each of the two arms of the Mach-Zehnder interferometer type semiconductor optical modulator is hardly affected by an electric field from the other even if different voltages are applied to the two arms (see FIG. 3). In addition, the first semiconductor cladding layer 3 may have a p-type conductivity, whereas the second semiconductor cladding layer 7 may have an n-type conductivity. In this case, the first semiconductor optical confinement layer 4 preferably has a p-type conductivity, whereas the second semiconductor optical confinement layer 6 preferably has an n-type conductivity. In addition, although the first semiconductor optical confinement layer 4 has an n-type (or a p-type) conductivity and the second semiconductor optical confinement layer 6 has a p-type (or an n-type) conductivity in the example described above, the first semiconductor optical confinement layer 4 and the second semiconductor optical confinement layer 6 may be undoped layers.

In addition, if the substrate 2 used is, for example, a GaAs substrate, the insulating layer 5 may be formed by epitaxially growing, for example, AlGaAs or AlAs on the substrate 2 as the group III-V compound semiconductor layer 50 and then oxidizing the AlGaAs or AlAs. In the insulating layer formation step, additionally, the side surfaces of the group III-V compound semiconductor layer 50 may be partially exposed to oxidize the group III-V compound semiconductor layer 50. In addition, the first semiconductor cladding layer 3, the first semiconductor optical confinement layer 4, the second semiconductor optical confinement layer 6, the second semiconductor cladding layer 7, and the contact layer 8 formed on the substrate 2 may be formed of a group III-V compound semiconductor having a lower aluminum content than the group III-V compound semiconductor layer 50. In this case, when the insulating layer 5 is formed by oxidizing the group III-V compound semiconductor layer 50 in the insulating layer formation step, the group III-V compound semiconductor layer 50, which has a higher aluminum content, can be selectively oxidized. Thus, the insulating layer 5 can be easily formed.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A semiconductor optical modulation device comprising:
   a substrate;
   a first semiconductor cladding layer of a first conductivity type disposed on the substrate;
   an optical waveguide layer disposed on the first semiconductor cladding layer, the optical waveguide layer including a first semiconductor optical confinement layer, a second semiconductor optical confinement layer, and an insulating layer disposed between the first semiconductor optical confinement layer and the second semiconductor optical confinement layer, the insulating layer being made of aluminum oxide;
   a second semiconductor cladding layer of a second conductivity type disposed on the optical waveguide layer;
   a first electrode electrically connected to the first semiconductor cladding layer; and
   a second electrode electrically connected to the second semiconductor cladding layer.

2. The semiconductor optical modulation device according to claim 1,
   wherein the first semiconductor cladding layer has a lower refractive index than the first semiconductor optical confinement layer and the second semiconductor optical confinement layer, and
   the second semiconductor cladding layer has a lower refractive index than the first semiconductor optical confinement layer and the second semiconductor optical confinement layer.

3. The semiconductor optical modulation device according to claim 1, wherein the insulating layer has a thickness of 5 to 50 nm.

4. The semiconductor optical modulation device according to claim 1, wherein the first semiconductor optical confinement layer and the second semiconductor optical confinement layer each have a thickness of 20 to 100 nm.

5. The semiconductor optical modulation device according to claim 1, wherein the average refractive index $n_{ave}$ of the optical waveguide layer is higher than the refractive indices of the first semiconductor cladding layer and the second semiconductor cladding layer.

6. The semiconductor optical modulation device according to claim 1,
   wherein the first semiconductor optical confinement layer comprises a group III-V compound semiconductor of the first conductivity type, and
   the second semiconductor optical confinement layer comprises a group III-V compound semiconductor of the second conductivity type.

7. The semiconductor optical modulation device according to claim 1,
   wherein the first semiconductor optical confinement layer comprises an undoped group III-V compound semiconductor, and
   second semiconductor optical confinement layer comprises an undoped group III-V compound semiconductor.

8. The semiconductor optical modulation device according to claim 1, wherein the insulating layer comprises an aluminum oxide layer formed by selectively oxidizing a group III-V compound semiconductor containing aluminum.

9. The semiconductor optical modulation device according to claim 8, wherein the group III-V compound semiconductor containing aluminum is AlInAs or AlGaInAs.

10. The semiconductor optical modulation device according to claim 1, wherein the first semiconductor cladding layer, the first semiconductor optical confinement layer, the second semiconductor optical confinement layer, and the second semiconductor cladding layer each are made of a group III-V compound semiconductor containing substantially no aluminum as a constituent element.

11. The semiconductor optical modulation device according to claim 1,
    wherein the semiconductor optical modulation device further comprises a third electrode disposed on a back surface of the substrate, the substrate being a semiconductor substrate of the first conductivity type.

12. A Mach-Zehnder interferometer type semiconductor optical modulator comprising:
    a first arm;
    a second arm;
    a first multimode interference (MMI) coupler having two optical input ports and two optical output ports; and
    a second MMI coupler having two optical input ports and two optical output ports,
    wherein one end of the first arm is connected to one of the two optical output ports of the first MMI coupler,
    one end of the second arm is connected to the other of the two optical output ports of the first MMI coupler,
    the other end of the first arm is connected to one of the two optical input ports of the second MMI coupler,
    the other end of the second arm is connected to the other of the two optical input ports of the second MMI coupler, and
    the first and second arms each include:
        a substrate;
        a first semiconductor cladding layer of a first conductivity type disposed on the substrate;
        an optical waveguide layer disposed on the first semiconductor cladding layer, the optical waveguide layer including a first semiconductor optical confinement layer, a second semiconductor optical confinement layer, and an insulating layer disposed between the first semiconductor optical confinement layer and the second semiconductor optical confinement layer, the insulating layer being made of aluminum oxide;

a second semiconductor cladding layer of a second conductivity type disposed on the optical waveguide layer;

a first electrode electrically connected to the first semiconductor cladding layer; and a second electrode electrically connected to the second semiconductor cladding layer.

13. The Mach-Zehnder interferometer type semiconductor optical modulator according to claim 12, wherein the insulating layer has a thickness of 5 to 50 nm.

14. The Mach-Zehnder interferometer type semiconductor optical modulator according to claim 12, wherein the two optical input ports and two optical output ports of each of the first and second MMI couplers form a through-port and a cross-port with each other, the first and second MMI couplers are configured to delay the phase of light traveling through the cross-port by 90° and not to shift the phase of light traveling through the through-port, and the first arm has a longer optical path length than the second arm by the length equivalent to a phase delay of 90°.

* * * * *